July 22, 1952 — G. W. DOOLEY — 2,604,032
ELECTRIC TOASTER
Filed Dec. 11, 1945 — 2 SHEETS—SHEET 1

INVENTOR.
GEORGE W. DOOLEY
BY *Ell Woodbury*
ATTORNEY

July 22, 1952     G. W. DOOLEY     2,604,032
ELECTRIC TOASTER

Filed Dec. 11, 1945     2 SHEETS—SHEET 2

INVENTOR.
GEORGE W. DOOLEY
BY
ATTORNEY

Patented July 22, 1952

2,604,032

UNITED STATES PATENT OFFICE 2,604,032

ELECTRIC TOASTER

George W. Dooley, Burbank, Calif., assignor to Bendix Aviation Corporation, South Bend, Ind., a corporation of Delaware Application December 11, 1945, Serial No. 634,202

7 Claims. (Cl. 99—389)

This invention relates to electric toasters for toasting bread and the like.

An object of the invention is to increase the speed of electric toasting.

Another object is to reduce the amount of power required to electrically toast bread and the like.

Another object is to provide an electric toaster, in which the exterior casing including the handles of the device and the control mechanism, are kept relatively cool.

Other more specific objects and features of the invention will be apparent from the description to follow of a particular embodiment of the invention.

Briefly, the present invention comprises a toaster for receiving one or more slices of bread, in which electrical heating elements of open construction are juxtaposed to the bread slices and air is circulated by a power driven fan through the heating elements and against the bread. The heated air dehydrates the bread or the surface thereof, and the heat applied to the bread, in part by conduction from the heated air and in part by radiation directly from the heating elements, is effective to quickly brown the bread.

Figure 1:
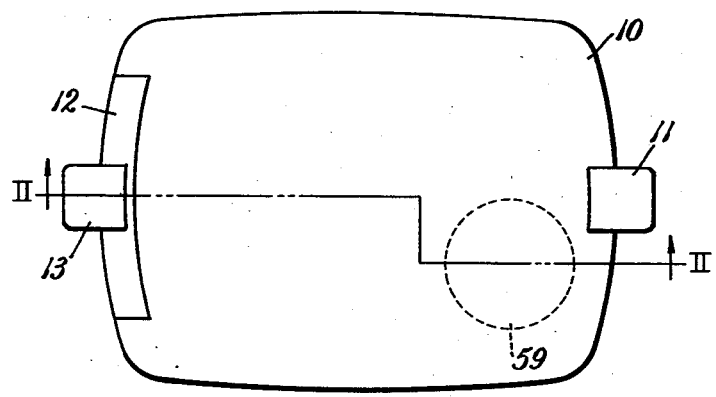
Fig. 1 is a plan view of one form of toaster in accordance with the invention.

Referring to Fig. 1, the toaster therein depicted has a smooth outer casing 10, having a handle 11 secured thereto at one end and having at its other end a door 12 having a handle 13.

Figure 2:
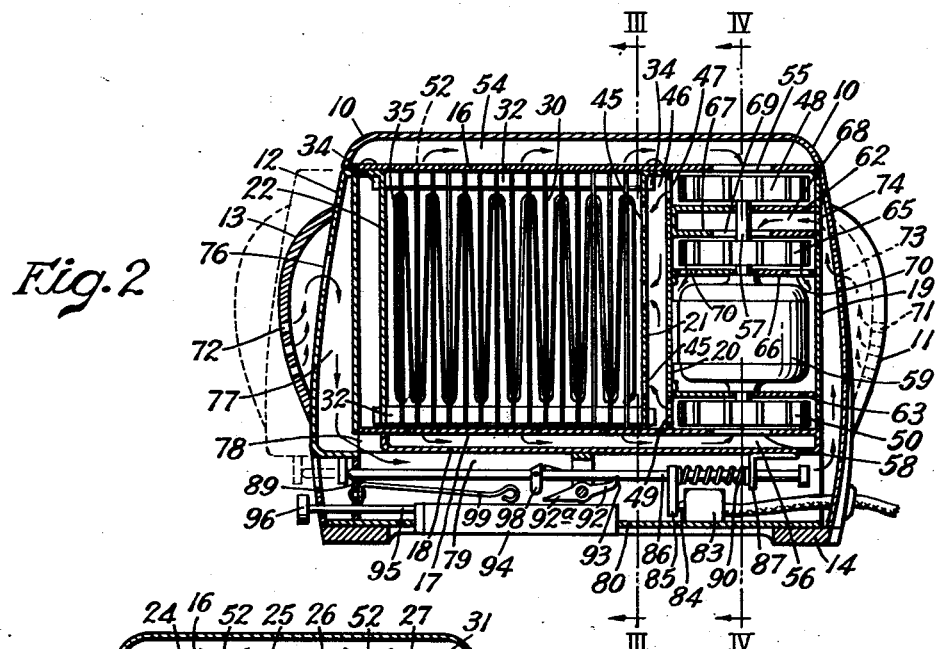
Fig. 2 is a longitudinal section taken along the broken line II—II of Fig. 1.

Referring to Fig. 2, the casing 10 is preferably of stamped metal and is open at the bottom, the lower edges of the casing being secured to a base frame 14 which may be of wood or plastic construction, and extends continuously around the lower edge of the casing 10.

Figure 3:
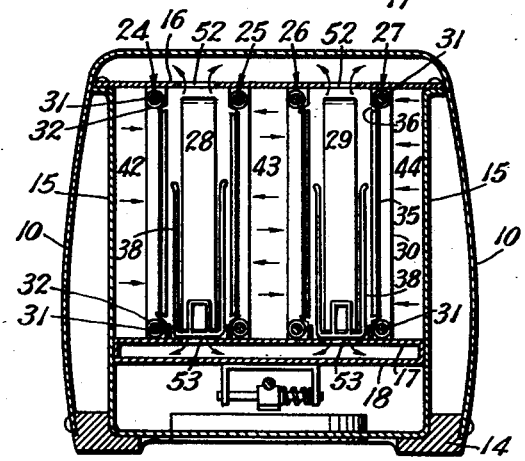
Fig. 3 is a cross section taken in the plane III—III of Figure 2.

Also secured to the base 14, and in generally spaced relation to the outer casing 10 is an inner casing comprising side walls 15 (Fig. 3), a top wall 16, a pair of spaced bottom walls 17 and 18, and transverse walls 20, 21 and 22.

The side walls 15, bottom wall 17, top wall 16 and transverse walls 21 and 22 define a toasting chamber containing spaced open heating elements between which the bread slices to be toasted are positioned. Thus, referring to Fig. 3, there are four sets of heating elements, 24, 25, 26 and 27 with means for supporting a slice of bread 28 between the heating elements 24 and 25, and supporting a slice of bread 29 between the heating elements 26 and 27.

Each of the heating elements 24, 25, 26 and 27 comprises a series of spaced mica strips 30 supported at their upper and lower ends by rods 31.

Insulating washers 32 (Fig. 2) are mounted on the rods 31 intermediate each successive pair of mica strips 30, and the strips and washers 32 are compressed together by nuts 34, screwed on to the opposite ends of the rods 31. The rods 31 extend through the transverse walls 21 and 22 at their opposite ends and the nuts 34 are exterior of the walls so that they not only clamp the mica strips 30 and the insulating washers 32 together, but also support the assembly from the transverse walls 21 and 22.

The heating element proper of each of the units 24, 25, 26 and 27 comprises a resistance wire 35 which is looped back and forth in notches 36 provided in the edges of the mica strips 30. All of the resistance wires 35 are connected together either in parallel or in series so that they are energized simultaneously. It will be observed that the transversely extending, spaced apart, mica strips 30 provide support and mechanical protection for the resistance wire 35 while permitting free flow of air transversely through each heating element past the resistance wire thereof.

Figure 6:
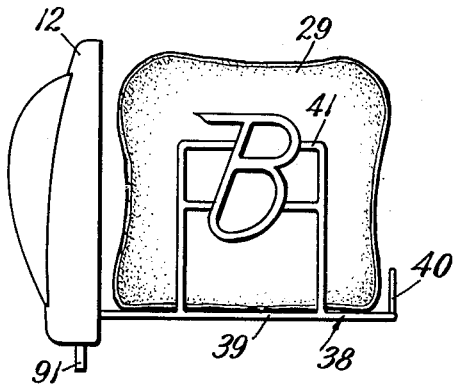
Fig. 6 is a side elevation of the bread supporting element containing a slice of bread.

The bread slices 28 and 29 are supported in a pair of spaced apart bread trays 38, each consisting of a base 39 (Fig. 6) secured to and extending from the door 12 so that they are removable with the door. The inner end of each base 39 is turned up to form a vertical wall 40 for retaining the bread against longitudinal movement out of the tray, and open side walls or guides 41 are provided for retaining the bread slices in vertical position without appreciably shielding the bread from the heat. As shown in Fig. 6, the side members 41 can, if desired, be given an ornamental or significant design which will be impressed upon the sides of the slices of toast due to the shadow effect of the side members 41.

As previously indicated, an important feature of the present invention is the forced circulation of air through the heating elements and on to the bread slices. To this end, the heating element 24 is spaced from one side wall 15 (Fig. 3) to provide an air passage 42; the two heating elements 25 and 26 are spaced from each other to define an air passage 43; and the heating element 27 is spaced from the other side wall 15 to define an air passage 44. Air is free to flow from each of these passages through the heating elements against the bread, but the passages are otherwise closed except for inlet holes 45 (Fig. 2) in the transverse wall 21, which holes 45 communicate the air passages 42, 43 and 44 with a chamber 46 defined between the transverse walls 20 and 21. When the device is in operation, air is delivered into the chamber 46 through an opening 47 in the wall 20 from a blower 48, and through an aperture 49 in the wall 20 from a blower 50. The front end of each of the passages 42, 43 and 44 is closed by the transverse wall 22, which wall has vertical slots therein to permit entry and withdrawal of the bread trays 38.

The air entering the passages 42, 43 and 44, through the inlet holes 45 in the transverse wall 21, flows transversely from the passages between the mica strips 30 of the heating elements 24, 25, 26 and 27, becomes heated as it does so by the hot resistance wires 35, and impinges against the sides of the bread slices 28 and 29. The hot air penetrates the bread to a certain extent, but in the main it is diverted upwardly and downwardly along the faces of the slices and escapes from the bread compartments through holes 52 in the top wall 16 and through holes 53 in the bottom wall 17. As is clearly shown in Fig. 2, the air passing upwardly through the holes 52 enters a passage 54 defined between the wall 16 and the outer casing 10, flows rearwardly through this passage and passes through an aperture 55 back into the blower 48, which then recirculates it. Likewise, air passing through the apertures 53 in the wall 17 enters a passage 56 defined between the walls 17 and 18, flows rearwardly, and passes through an aperture 58 back into the blower 50 and is recirculated.

Figure 5:
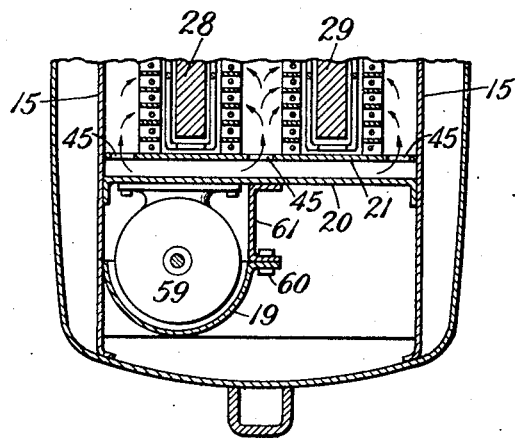
Fig. 5 is a partial horizontal section taken in the plane V—V of Fig. 4.

As is clearly shown in Fig. 2, the blowers 48 and 50 are mounted on opposite ends of a shaft 57 of an electric motor 59, which is mounted on the wall 20. The blowers 48 and 50 are contained within blower casings having a peripheral wall 19 (Figs. 2 and 5) which is detachably connected as by bolts 60 to the rear edge of a longitudinal wall 61, the forward edge of which is secured as by welding to the transverse wall 20. The housing for the blower 48 is completed by the upper wall 16 and a lower wall 62 which may be made in two half sections, one of which is secured to the wall 19 and the other of which is secured to the wall 20 and the wall 61. The housing for the blower 50 is completed by the horizontal wall 17 and a horizontal wall 63 which may be made in two sections, one secured to the wall 19 and the other secured to the wall 20 and 61.

In addition to the blowers 48 and 50 which circulate air through the heating elements on to the bread to facilitate the toasting thereof, a third blower 65 (Fig. 2) is provided on the motor shaft 57. This blower is mounted in a housing defined by the walls 20, 19 and 61 and two horizontal walls 66 and 67.

This blower 65 is for the purpose of circulating cooling air to maintain the handles, the timing mechanism and the motor at a reasonably low temperature. The blower draws air from a space 68 between the walls 62 and 67 through an inlet hole 69, and discharges it through holes 70 in the wall 66 and the space surrounding the motor 59. The exhaust of air from the chamber 68 by the blower 65 produces a suction of air inwardly through holes 71 in the handle 11 and through holes 72 in the handle 13. Thus, air entering the holes 71 in handle 11 flows through the hollow handle and through an aperture 73 in casing 10 below the handle into the space between the wall 19 and casing 10, from which it is drawn into the space 68 through an aperture 74. Air entering the holes 72 in the handle 13 likewise flows through the hollow handle 13 and through an aperture 76 in the door 12 below the handle into a space 77 within the door, thence through an opening 78 near the bottom of the door into a space 79 between the wall 18 and a bottom wall 80. The air flows rearwardly through the space 79 and into the space defined between the wall 19 and the outer casing 10, where it mixes with the air drawn in through the handle 11 and enters the blower 65.

Figure 4:
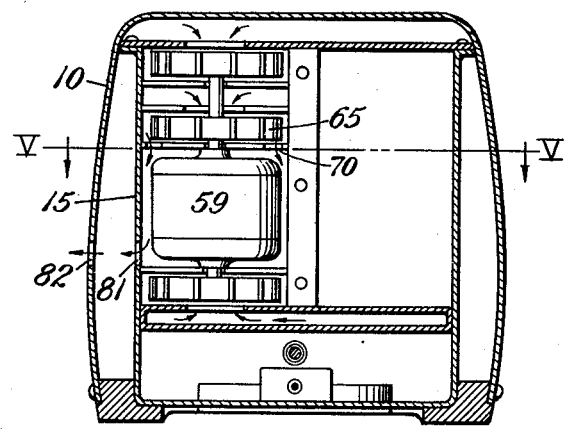
Fig. 4 is a cross section taken in the plane IV—IV of Fig. 2.

The air discharged from the blower 65 through the holes 70 (Fig. 4) flows around the motor 59 and is discharged through a hole 81 in the side wall 15 and through a hole 82 in the outer casing 10.

The structure described may be adapted either for non-automatic or automatic operation. If non-automatic operation is desired, any type of manual switch can be employed to open and close a power circuit to the heating elements and the motor 59.

However, the structure is readily adapted for automatic operation, in which case the motor and heating elements may be energized through a switch 83 (Fig. 2) having a plunger 84 which closes the circuit to the motor and heating elements when it is depressed, and opens the circuit when it is released. The plunger 84 is adapted to be depressed by a projection 85 on a rod 86 which extends longitudinally through the space 79 and is supported for longitudinal movement near its rear end by a guide bracket 87 secured to the wall 18. The forward end of the rod 86 extends through a hole in a front wall 89, which slidably supports it.

When the toaster is not in use, the rod 86 is urged into a forward position by a spring 90 compressed between the bracket 87 and the projection 85, in which position the switch plunger 84 is released and the switch is open. To operate the toaster, bread is placed in the bread racks 38 while the door 12 is either partially open or entirely removed from the toaster after which the door is pressed into closed position. The door 12 has a projection 91 at the bottom which is aligned with the rod 86 so that as the door is pressed home, the rod 86 is moved rearwardly against the force of the spring 90 until the projection 85 on the rod presses the switch plunger 84 and closes the switch. The rod 86 is locked in this position by a rocking latch 92 which engages a notch 93 in the rod. After a predetermined time the latch 92 is rocked out of engagement with the notch 93 permitting the spring 90 to return the rod to the left, thereby opening the switch 83 and also kicking the door 12 partially open to indicate that the operation is completed.

Various types of timing mechanisms are known and may be employed to release the latch 92, and such timing mechanisms do not of themselves constitute a part of the present invention. There is shown in the drawing a timing unit 94 which may have a top wall so arranged that when the wall is depressed it gradually returns to an upper position. The time of return may be controlled by a valve connected by a shaft 95 to a knob 96 on the outside of the casing. In operation, when the door 12 is first pressed home, a spring dog 98 on the rod 86 rides along a cam spring 99 and presses the latter down against the top of the timer 94 to depress it. The top of the timer thereafter gradually returns as previously mentioned and after a predetermined interval rises against the left end 92a of the dog 92 to rotate the latter out of the notch 93. As the rod 86 is returned by the spring 90, the dog 98 rotates to slip over the cam spring 99.

Although for the purpose of explaining the invention one embodiment thereof has been described in detail, numerous departures from the exact construction shown can be made without departing from the invention which is to be limited only to the extent set forth in the appended claims.

I claim:

1. Apparatus of the type described comprising: a pair of generally flat, parallel, electrical heat radiating elements pervious to air flow transversely therethrough and spaced apart a distance slightly greater than the thickness of a slice of bread; means cooperating with said heating elements and defining therewith a bread chamber for supporting a slice of bread between said elements in direct heat-absorbing relation thereto; air blowing means for delivering a forced draft of air; and passage means for conducting air from said blowing means through said heating elements into said bread chamber.

2. Apparatus as described in claim 1 including second passage means connecting edges of said bread chamber to the inlet of said blowing means for producing in conjunction with the first-mentioned passage means a closed circulation of air from the blowing means through said heating elements to said bread chamber, and thence back to said blowing means.

3. An electric toaster comprising: a casing; air-pervious electric heating elements positioned within said casing; means for supporting a slice of bread to be toasted between said heating elements; an electric motor in said casing; a first blower and a second blower driven by said electric motor; passage means connecting said first blower with said air-pervious heating elements whereby said first blower circulates air through said heating elements onto bread to be toasted; other passage means defining a flow path for air through portions of said toaster to be cooled, and means including said second blower for circulating air through said flow path.

4. An electric toaster comprising: a casing; means for supporting an article to be toasted within said casing; electrical heating means within said casing for toasting an article supported therein; a hollow handle on said casing; and means including an electric blower in said casing for circulating cooling air through said hollow handle to cool it.

5. An electric toaster as described in claim 4 in which said hollow handle has apertures therein communicating the interior of the handle with the exterior thereof, and in which said means for circulating cooling air includes duct means connecting the intake of said electric blower to said hollow handle whereby said blower draws cooling air into said handle through the apertures therein.

6. An electric toaster comprising: a casing having an opening therein; means for supporting an article to be toasted within said casing; eelctrical heating means within said casing for toasting an article supported therein; a hollow door removable from said casing for closing said opening therein; and means including an electric blower exterior of said hollow door and in said casing for circulating cooling air through said hollow door when it is in position to close said opening.

7. An electric toaster as described in claim 6 in which said hollow door has a hollow handle thereon, the handle having apertures connecting its interior with its exterior, the interior of the handle being connected to the space within said hollow door; said air circulating means including passage means in said casing and an opening in said hollow door for connecting said hollow door to the intake of said electric blower when the door is in closed position with respect to said casing.

GEORGE W. DOOLEY.

REFERENCES CITED

The following references are of record in the file of this patent:

UNITED STATES PATENTS

| Number | Name | Date |
|---|---|---|
| 216,346 | Read | June 10, 1879 |
| 610,668 | Wilson | Sept. 13, 1898 |
| 1,088,178 | Prentiss | Feb. 24, 1914 |
| 1,228,956 | Noonan | June 5, 1917 |
| 1,529,342 | Christy | Mar. 10, 1925 |
| 1,828,542 | Padleford | Oct. 20, 1931 |
| 1,892,117 | Perkins | Dec. 27, 1932 |
| 1,900,737 | Rohne | Mar. 7, 1933 |
| 2,046,471 | Lavenburg | July 7, 1936 |
| 2,106,462 | Lindberg | Jan. 25, 1938 |
| 2,248,867 | Hallman | July 8, 1941 |
| 2,282,082 | Newell | May 5, 1942 |
| 2,339,183 | Meyers | Jan. 11, 1944 |
| 2,344,842 | Weeks | Mar. 21, 1944 |
| 2,414,082 | Barclay | Jan. 14, 1947 |